United States Patent
Castlebary

(10) Patent No.: US 7,496,728 B2
(45) Date of Patent: Feb. 24, 2009

(54) ASYNCHRONOUS JITTER REDUCTION TECHNIQUE

(75) Inventor: Robert Allen Castlebary, Nevada City, CA (US)

(73) Assignee: Grass Valley (U.S.) Inc., Nevada City, CA (US)

( * ) Notice: Subject to any disclaimer, the term of this patent is extended or adjusted under 35 U.S.C. 154(b) by 306 days.

(21) Appl. No.: 10/551,084

(22) PCT Filed: Feb. 10, 2004

(86) PCT No.: PCT/US2004/003773

§ 371 (c)(1), (2), (4) Date: Sep. 27, 2005

(87) PCT Pub. No.: WO2004/095460

PCT Pub. Date: Nov. 4, 2004

(65) Prior Publication Data

US 2006/0190638 A1    Aug. 24, 2006

Related U.S. Application Data

(60) Provisional application No. 60/458,649, filed on Mar. 28, 2003.

(51) Int. Cl.
G11C 8/18 (2006.01)
G06F 5/06 (2006.01)

(52) U.S. Cl. .............. 711/167; 365/233.17; 710/61

(58) Field of Classification Search .......... None
See application file for complete search history.

(56) References Cited

U.S. PATENT DOCUMENTS

| 4,805,198 | A | * | 2/1989 | Stern et al. ............ 375/371 |
| 5,303,061 | A | | 4/1994 | Matsumoto et al. |
| 5,428,649 | A | * | 6/1995 | Cecchi ............... 375/372 |
| 5,828,362 | A | | 10/1998 | Takahashi et al. |
| 6,005,872 | A | | 12/1999 | Bassi et al. |
| 6,556,249 | B1 | | 4/2003 | Taylor et al. |
| 6,801,706 | B1 | * | 10/2004 | Jesuk ............... 386/12 |
| 2007/0116062 | A1 | * | 5/2007 | Spalink ............ 370/503 |

FOREIGN PATENT DOCUMENTS

| GB | 2 275 851 | 7/1994 |
| GB | 2331645 | 5/1999 |
| WO | WO 95/32550 | 11/1995 |

* cited by examiner

Primary Examiner—Gary J Portka
(74) Attorney, Agent, or Firm—Robert D. Shedd; Robert B. Levy

(57) ABSTRACT

The amount of jitter incurred when reading data written into a FIFO can be reduced by clocking the FIFO with Read Clock pulses at a frequency $xf_n$, where x is a whole integer and $f_n$ is the frequency at which the memory is clocked to write data. Read Addresses are applied to the FIFO at a frequency on the order of $f_n$ to identify successive locations in the memory for reading when the memory is clocked with read clocked pulses to enable reading of samples stored at such successive locations. The duration of at least one successive Read Addresses is altered in response to memory usage status to maintain memory capacity below a prescribed threshold.

10 Claims, 2 Drawing Sheets

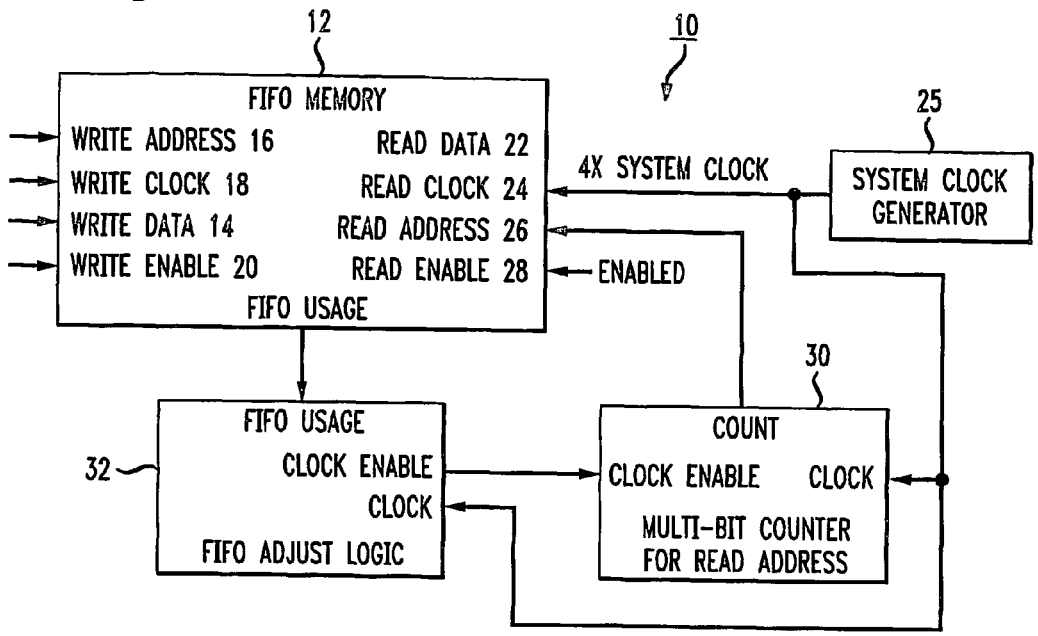

FIG. 1

```
If Fifo Usage = OK
                            !FifoAdjustSequnce
if Fifo Usage = Empty or Almost Empty
            Start FifoAdjust Sequence &
                                  Repeat
if Fifo Usage = Full or Almost Full
            Start FifoAdjustSequence &
                                    Drop
If !FifoAdjustSequence
            Clock Enable every 4th clock cycle
If FifoAdjustSequence & Drop
            Clock Enable after 3rd clock cycle
If FifoAdjustSequence & Repeat
            Clock Enable after 5th clock cycle Note FifoAdjustSequence drop 4 1/4samples
over a period of time.
```

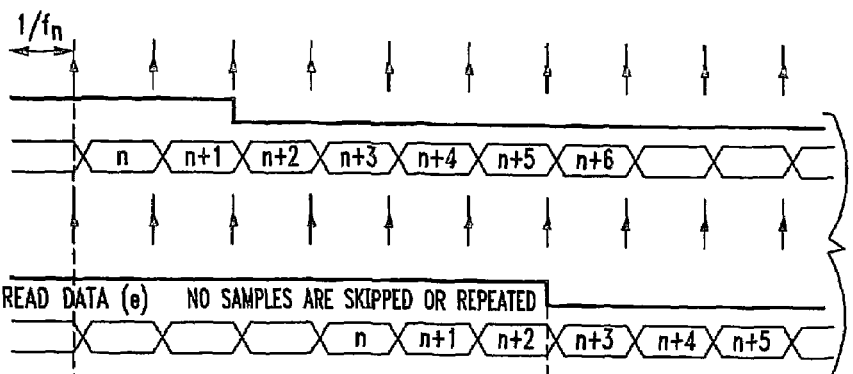
FIG. 2
FIG. 3
FIG. 4
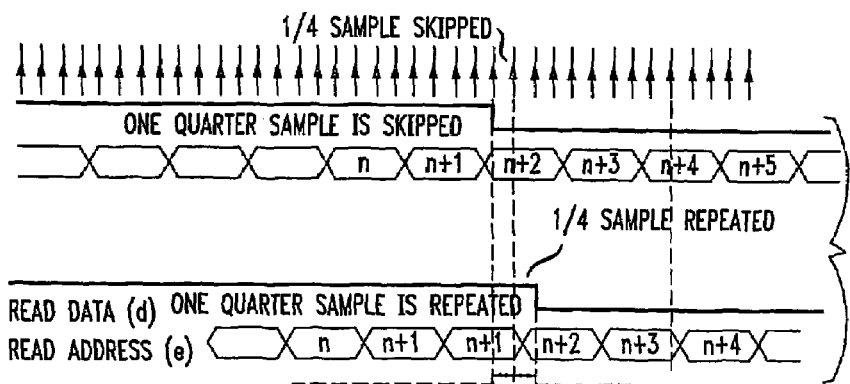
FIG. 5

ASYNCHRONOUS JITTER REDUCTION TECHNIQUE

CROSS-REFERENCE TO RELATED APPLICATIONS

This application claims the benefit, under 35 U.S.C. § 365 of International Application PCT/US2004/003773, filed Feb. 10, 2004, which was published in accordance with PCT Article 21(2) on Nov. 4, 2004 in English and which claims the benefit of U.S. provisional patent application No. 60/458,649, filed Mar. 28, 2003.

TECHNICAL FIELD

This invention relates to technique for reducing jitter with the reading of data to, and the subsequent writing of data from a memory device when the read and write clocks are asynchronous.

BACKGROUND ART

Present day digital memories, such as First-In First-Out devices (FIFOs) operate in response to a periodic clock signal generated by a system clock. With a FIFO device, the writing of data to successive locations occurs upon the receipt of successive write clock pulses. By the same token, the reading of data from each of the successive locations previously written with data occurs upon the receipt of successive read clock pulses. Dynamic phase and frequency differences between the read and write clock create jitter. Increasing the read clock frequency will reduce the incidence of jitter. However, in a device such as a FIFO, increasing the read clock frequency can lead to reading the device too rapidly without a corresponding increase in the write clock frequency. Increasing the write clock frequency will overcome this difficulty. However, the ability to increase the write clock frequency does not always exist.

Thus, there is a need for a technique for accessing data written into a memory device that overcomes the aforementioned disadvantages.

BRIEF SUMMARY

Briefly, in accordance with a preferred embodiment, there is provided a method for reading data from a memory device with reduced jitter. The method commences upon the application of successive read clock pulses applied at a frequency of $xf_n$ where x is an integer, and $f_n$ is the write clock frequency. A succession of read addresses, each of a given duration, is applied to the memory device in to identify successive corresponding locations from which data is read. The duration of at least one of the succession of addresses is altered to skip or repeat fractional samples responsive to the rate at which data is being read to enable reading of the memory with reduced jitter while assuring that data is not being read out at too high a rate.

BRIEF DESCRIPTION OF THE DRAWINGS

FIG. 1 depicts a block schematic diagram of memory circuit in accordance with a preferred embodiment of the present principles that enables reading out of data with reduced jitter;

FIG. 2 depicts a set of timing charts for a FIFO memory with synchronized read and write clock pulses resulting in no skipped data samples;

FIG. 3 depicts a set of timing charts for a FIFO memory with asynchronous write and read clock pulses, requiring skipping of a data sample;

FIG. 4 depicts a set of timing charts for a FIFO memory with asynchronous write and read clock pulses, requiring repeating of a data sample;

FIG. 5 depicts a set of timing charts for the FIFO memory of FIG. 1 wherein read clock frequency is a multiple of the write clock, and a fractional sample is skipped or repeated as necessary, in accordance with the present principles, to avoid reading the FIFO too quickly.

DETAILED DESCRIPTION

FIG. 1 depicts a memory circuit 10 comprised of a First-In First-Out-type memory 12 that operates to read and write data at the same time. The FIFO 12 has Write Data input 14 for receiving (writing) data for storage, and a Write Address bus 16 for receiving write addresses. Each write address received on the Write Address bus 16 specifies a corresponding storage location in the FIFO 12 for receiving the data appearing the Write Data input 14. The FIFO 12 writes data into the corresponding storage location upon the receipt of a periodic clock pulse received at a Write Clock input 18 while the FIFO receives a Write Enable signal at a prescribed logic state at a Write Enable input 19. In practice, the Write Clock pulses have a frequency $f_n$.

The FIFO 12 has a Read Data output 22 on which the FIFO outputs data read from the storage location whose address appears on a Read Address bus 24. The FIFO 12 reads from the corresponding storage location upon the receipt of a periodic Read Clock pulse received at a Read Clock input 24 while the FIFO receives a Read Enable signal at a prescribed logic state at a Read Enable input 28. A system clock 25 provides Read Clock pulses to the FIFO 12, whereas a multi-bit counter generates 30 the read addresses.

In accordance with an aspect of the present principles, the multi-bit counter 30 varies the duration of at least one of the successive Read Addresses applied to the FIFO 12 in accordance the file usage status of the FIFO as determined by a FIFO Adjust Logic block 32. The block 32 determines the usage of the FIFO memory 12 in response file usage signal from the FIFO. In response, the block 32 supplies a clock enable signal to control the multi-bit counter 30, which in turn, determines how fast or slow to read the FIFO 12 relative to being written, to reduce jitter.

Increasing the Read Clock frequency of the FIFO will reduce the incidence of jitter, that is, the uncertainty in the sample value between successive readings. However, increasing the Read Clock can lead to reading the reading the FIFO too quickly. In other words, a read clock frequency in excess of the write clock frequency can causes the FIFO to run out of data, leading to invalid output data. Conversely, a write clock frequency in excess of the read clock frequency typically causes the FIFO to fill up too quickly. In the past, management of the difference between the read and write clock frequencies required repeating or skipping of whole samples read from the FIFO, adding a full sample of jitter to the output data.

To better understand the disadvantage of the prior art jitter management technique, refer to FIG. 2 which depicts a set of timing charts for a FIFO memory with synchronized read and write clock pulses. As seen in line (a) of FIG. 2, the Write Clock pulse period is $1/f_n$. Assume that the input data stream (shown in line (b)) undergoes a change in state upon the fourth write clock pulse in line (a) of FIG. 2. While the Write Enable input of the FIFO remains at the prescribed logic level, the FIFO will write successive storage locations with samples of the input stream upon receipt of successive Write Addresses. Upon the receipt of a Read Enable signal at the prescribed logic level, the FIFO will read out samples stored at the storage locations whose addresses appear at the FIFO read address input. Line (e) of FIG. 2 depicts the data read from the FIFO at each of the storage locations corresponding to the Read Addresses appearing on line (f) of FIG. 2. As long as the read and write clock signals remain synchronized, no repeats or skips are necessary.

As discussed previously, a write clock frequency in excess of the read clock frequency can cause the FIFO 12 to fill too quickly. One approach to avoiding this difficulty requires dropping or skipping of a sample during reading of the FIFO as shown in FIG. 3. Line (a) of FIG. 3 depicts the stream of data read from the FIFO, whereas line (b) of FIG. 3 depicts the succession of read addresses applied to the FIFO. In the event that the Write Clock frequency exceeds the read clock frequency, a need exists to "catch up" by dropping or skipping samples that would otherwise be read out. As an example, the sample value at the storage location n+3 of line (b) of FIG. 3 is skipped. Skipping one sample increases the jitter by a whole clock cycle. Conversely, a Read Clock frequency in excess of the Write Clock frequency can cause the FIFO to read data too quickly. To avoid this difficulty typically requires the FIFO to repeat reading of at least one sample. Line (a) of FIG. 4 depicts the stream of data read from the FIFO, whereas line (b) of FIG. 4 depicts the succession of read addresses applied to the FIFO with at least one address (n+1) being repeated to slow down the reading out of samples. Repeating a sample increases the jitter by one whole clock period.

As discussed, the FIFO Adjust Logic block 32 varies the timing of the transmission of the clock enable signal to the multi-bit counter 30 causing the multi-bit counter to vary the duration of the Read Addresses to skip or repeat fractional samples as necessary. As seen in the table in FIG. 1, if the FIFO Memory 12 usage is acceptable (i.e., the rate of reading and writing the FIFO memory remains approximately the same), the FIFO Adjust Logic block 32 executes a !FifoAdjust Sequence during which it sends a clock enable signal to the multi-bit counter 30 every 4th clock cycle. No skipping or repeating of samples will occur during this sequence. If the FIFO Adjust Logic block 32 detects that the FIFO memory 12 has become empty or nearly so, then the block starts a FIFO Adjust Sequence & Repeat to provide the multi-bit counter with a clock enable after the first clock from the System Clock Generator 25. This causes repeating of a fraction of sample. Conversely, if the FIFO Adjust Logic block 32 detects that the FIFO memory is full or nearly so, the block starts a FIFO Adjust Sequence & Drop during which it will send clock enable to the Multi-bit counter 30 after the 3d clock cycle, causing the skipping of a fraction of a sample.

The manner in which such reduced jitter is achieved in accordance with the above-described technique can best be understood by reference to FIG. 5. Line (a) of FIG. 5 depicts successive Read Clock pulses generated at a whole multiple x of the Write Clock frequency. In other words, the Read Clock frequency equals $xf_n$. In the illustrated embodiment, x equals four, although other integer values of x are possible. While the FIFO 12 receives Read Clock pulses from the system clock 25 at a frequency $xf_n$, the multi-bit counter 30 applies read addresses to the FIFO 12 at much slower rate, typically at a frequency on the order of $f_n$. Under such conditions, the FIFO will output the same sample x times.

To compensate for a lack of synchronism between reading and writing of data, the multi-bit counter 30 varies the length of one or more addresses to skip or repeat a fraction of a sample in accordance with the usage status of the FIFO 12 to prevent over flow or under flow, and thus maintain the FIFO capacity with prescribed threshold limits. As shown on line (c), the duration (length) of at least one read address (e.g. read address (n+2) is skipped to skip a fraction of a sample (e.g., a ¼ sample), as shown in line (b) of FIG. 5, to compensate when the reading of data from the FIFO 12 lags the writing of data. Referring to line (e) of FIG. 5, the duration of at least one read address (e.g. read address (n+2) is lengthened to repeat a fraction of a sample (e.g., a ¼ sample), as shown in line (d) of FIG. 5, to compensate when the writing of data from the FIFO 12 lags the reading of data. By increasing the Read Clock frequency in the manner described above, the jitter caused by repeating or skipping a sample becomes 1/x of the clock cycle, rather than a whole clock pulse as in the case with the prior art approach illustrated in FIGS. 3 and 4. Since this technique only skips or repeats a fractional sample, such skips or repeats will likely need to occur more often because less correction occurs during each cycle.

The foregoing describes a technique for reducing jitter in connection with the writing of data to, and the subsequent reading of the data from a memory device such as a FIFO.

The invention claimed is:

1. A method for reading data from a memory to achieve reduced jitter, comprising the steps of:

applying successive read clock pulses to the memory at a frequency of $xf_n$ where x is a whole integer and $f_n$ is the frequency at which the memory is clocked to write data;

applying successive Read Addresses to the memory at a rate slower than the $xf_n$ frequency of said applying successive read clock pulses to identify successive locations in the memory for reading when the memory is clocked with read clocked pulses to enable reading of samples stored at such successive locations; and altering the duration of at least one successive Read Addresses in response to memory usage status to maintain memory capacity below a prescribed threshold, by lengthening the duration of the at least one Read Address to repeat reading of a fractional sample.

2. The method according to claim 1 further comprising the step of lengthening the duration of more than one Read Address to repeat the reading of more than one fractional sample.

3. A method for reading data from a memory to achieve reduced jitter, comprising the steps of:

applying successive read clock pulses to the memory at a frequency of $xf_n$ where x is a whole integer and $f_n$ is the frequency at which the memory is clocked to write data;

applying successive Read Addresses to the memory at a rate slower than the $xf_n$ frequency of said applying successive read clock pulses to identify successive locations in the memory for reading when the memory is clocked with read clocked pulses to enable reading of samples stored at such successive locations; and altering the duration of at least one successive Read Addresses in response to memory usage status to maintain memory capacity below a prescribed threshold by shortening the duration of the at least one Read Address to skip reading of a fractional sample.

4. The method according to claim 3, further comprising the step of shortening the duration of more than one Read Address to skip reading of more than one fractional sample.

5. The method according to claim 1 further comprising the step of applying the successive read clock pulses to the memory at a frequency four times the frequency $f_n$.

6. An apparatus for reading stored data to achieve reduced jitter, comprising:

a memory into which data is written and from which data is read;

a clock applying successive read clock pulses to the memory at a frequency of $xf_n$ where x is a whole integer and $f_n$ is the frequency at which the memory is clocked to write data;

a memory address generator for applying successive Read Addresses to the memory at a rate slower than the $xf_n$ frequency of said clock applying successive read clock pulses to identify successive locations in the memory for reading when the memory is clocked with read clocked pulses to enable reading of samples stored at such successive locations; and for altering the duration of at least one successive Read Addresses in response to memory usage status to maintain memory capacity below a prescribed threshold, wherein the memory address generator lengthens the duration of the at least one Read Address to repeat reading of a fractional sample.

7. The apparatus according to claim 6 wherein the memory address generator lengthens the duration of more than one Read Address to repeat the reading of more than one fractional sample.

8. An apparatus for reading stored data to achieve reduced jitter, comprising:

a memory into which data is written and from which data is read;

a clock applying successive read clock pulses to the memory at a frequency of $xf_n$ where x is a whole integer and $f_n$ is the frequency at which the memory is clocked to write data;

a memory address generator for applying successive Read Addresses to the memory at a rate slower than the $xf_n$ frequency of said clock applying successive read clock pulses to identify successive locations in the memory for reading when the memory is clocked with read clocked pulses to enable reading of samples stored at such successive locations; and for altering the duration of at least one successive Read Addresses in response to memory usage status to maintain memory capacity below a prescribed threshold, wherein the memory address generator shortens the duration of the at least one Read Address to skip reading of a fractional sample.

9. The apparatus according to claim 8 wherein the memory address generator shortens the duration of more than one Read Address to skip reading of more than one fractional sample.

10. The apparatus according to claim 6 wherein the system clock applies successive read clock pulses to the memory at a frequency four times the frequency $f_n$.

* * * * *